US012759857B2

(12) United States Patent
Bruffett et al.

(10) Patent No.: US 12,759,857 B2
(45) Date of Patent: Oct. 13, 2026

(54) COORDINATED OPERATION OF AUTOMATED DISPENSING SYSTEMS TO DISPENSE BEVERAGES ACCORDING TO DYNAMICALLY GENERATED FORMULAS

(71) Applicant: Starbucks Corporation, Seattle, WA (US)

(72) Inventors: Paul Alexander Bruffett, Seattle, WA (US); Tyson Mark Colby, Seattle, WA (US); Jason Hizon Latonio, San Diego, CA (US)

(73) Assignee: Starbucks Corporation, Seattle, WA (US)

( * ) Notice: Subject to any disclaimer, the term of this patent is extended or adjusted under 35 U.S.C. 154(b) by 604 days.

(21) Appl. No.: 18/347,442

(22) Filed: Jul. 5, 2023

(65) Prior Publication Data

US 2023/0339738 A1 Oct. 26, 2023

Related U.S. Application Data

(63) Continuation-in-part of application No. 17/646,637, filed on Dec. 30, 2021.

(51) Int. Cl.
*B67D 1/00* (2006.01)
*B67D 1/08* (2006.01)

(52) U.S. Cl.
CPC ......... *B67D 1/0034* (2013.01); *B67D 1/0888* (2013.01)

(58) Field of Classification Search
CPC .. B67D 1/0034; B67D 1/0888; B67D 1/0041; A47J 31/404; A47J 31/521; A47J 31/402; G07F 9/002; G07F 13/065
See application file for complete search history.

(56) References Cited

U.S. PATENT DOCUMENTS 9,808,114 B1 * 11/2017 Heys ........................ A47J 31/44
11,272,806 B1 * 3/2022 Studor .................. A47J 31/525
(Continued)

FOREIGN PATENT DOCUMENTS

WO WO 2023/129511 7/2023
WO WO 2025/010230 1/2025
WO WO 2025/010230 A1 1/2025

OTHER PUBLICATIONS

International Search Report and Wirtten Opinion received in application No. PCT/US2022/053975, mailed Apr. 12, 2023, 14 pages.
(Continued)

*Primary Examiner* — Michael Collins
(74) *Attorney, Agent, or Firm* — Knobbe, Martens, Olson & Bear, LLP

(57) ABSTRACT

The disclosure generally relates to a system for dynamically generating a second formula for a beverage based on a first formula for the beverage, a modification, and a formula generation policy. The second formula may indicate components for the beverages, measures of the components, and/or a sequencing order for the components. Based on the second formula, the system can build computer-executable instructions for automated dispensing systems and route the computer-executable instructions to the automated dispensing systems. By routing the computer-executable instructions to the automated dispensing systems, the system may cause the automated dispensing systems to build the beverage.

25 Claims, 5 Drawing Sheets

(56) References Cited

U.S. PATENT DOCUMENTS

| | | | | |
|---|---|---|---|---|
| 11,440,784 | B2 | 9/2022 | Venkatakrishnan et al. | |
| 12,147,922 | B2 * | 11/2024 | Sun | G06Q 10/0875 |
| 2005/0048461 | A1 * | 3/2005 | Lahteenmaki | G16B 50/00 435/3 |
| 2006/0051296 | A1 * | 3/2006 | Holahan | A23L 33/10 424/9.41 |
| 2006/0134299 | A1 * | 6/2006 | Lahteenmaki | A23L 2/38 426/590 |
| 2011/0121032 | A1 * | 5/2011 | Deo | B67D 1/0032 222/145.1 |
| 2011/0123688 | A1 | 5/2011 | Deo et al. | |
| 2013/0282169 | A1 | 10/2013 | Moore et al. | |
| 2014/0236351 | A1 * | 8/2014 | Hyde | G16H 40/67 700/244 |
| 2015/0144653 | A1 | 5/2015 | Kline et al. | |
| 2016/0055599 | A1 | 2/2016 | Illy et al. | |
| 2017/0186110 | A1 * | 6/2017 | Carpenter | G06Q 50/12 |
| 2018/0325307 | A1 | 11/2018 | Stasch et al. | |
| 2021/0221667 | A1 | 7/2021 | Venkatakrishnan et al. | |
| 2023/0211997 | A1 | 7/2023 | Bruffett et al. | |
| 2024/0119250 | A1 * | 4/2024 | Shaikh | G06M 1/045 |

OTHER PUBLICATIONS

International Search Report and Written Opinion in Application No. PCT/US2024/036425, mailed on Oct. 1, 2024, in 15 pages.

* cited by examiner

COORDINATED OPERATION OF AUTOMATED DISPENSING SYSTEMS TO DISPENSE BEVERAGES ACCORDING TO DYNAMICALLY GENERATED FORMULAS

RELATED APPLICATIONS

This application is a continuation-in-part of U.S. patent application Ser. No. 17/646,637, filed Dec. 30, 2021, entitled "METHOD FOR CAPTURING, ANALYZING, AND DISPENSING BEVERAGE ORDERS," the entire contents of which is hereby incorporated by reference herein.

FIELD

The present disclosure generally relates to an automated beverage dispensing platform to automatedly dispense a beverage in accordance with a formula.

BACKGROUND

Beverages may be associated with formulas that may be used to create the beverage (e.g., in response to an order).

Figure 1:
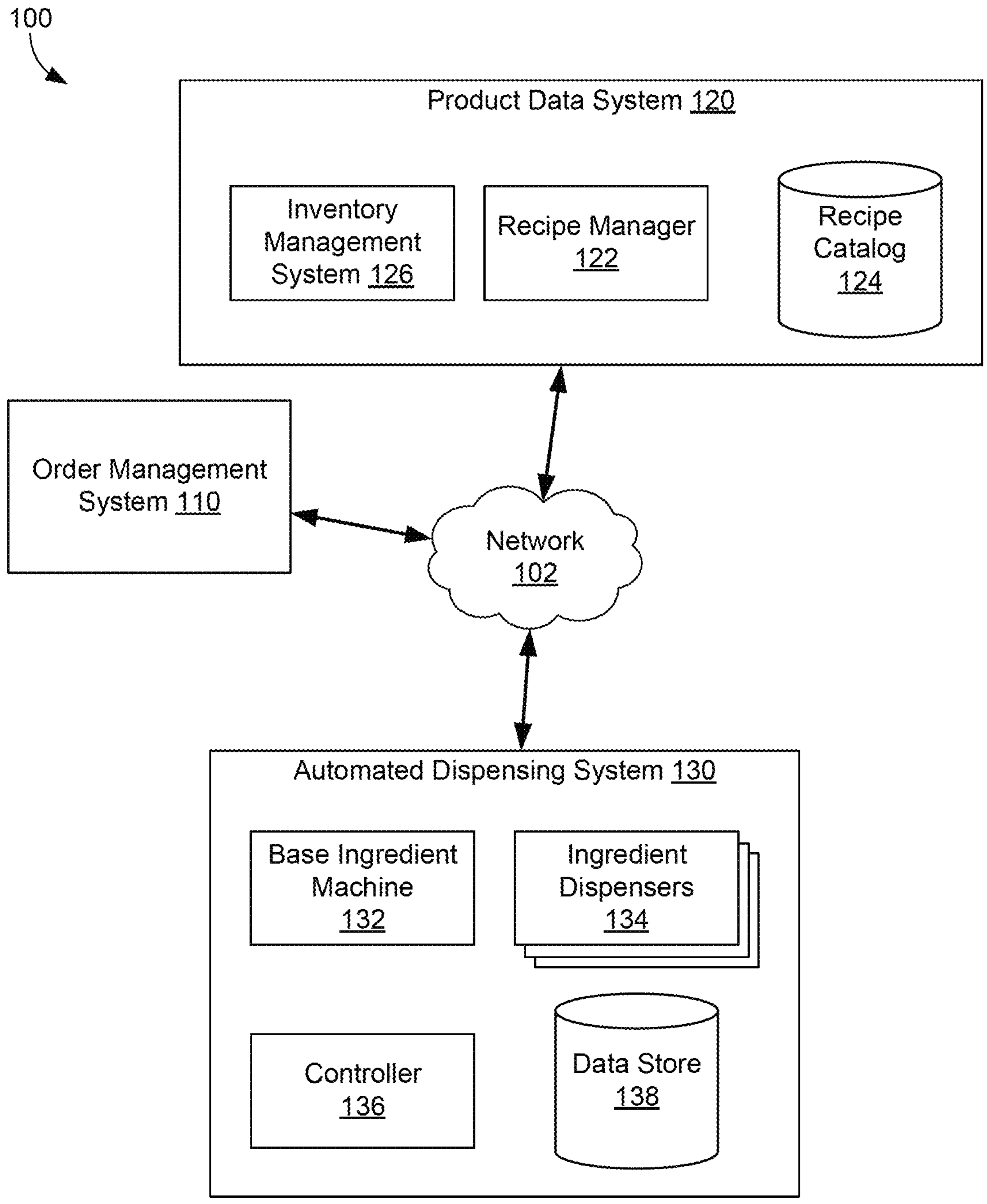
FIG. 1 illustrates an embodiment of a beverage management and dispensing environment.

Various embodiments are depicted in the accompanying drawings for illustrative purposes, and should in no way be interpreted as limiting the scope of the embodiments. Furthermore, various features of different disclosed embodiments can be combined to form additional embodiments, which are part of this disclosure.

DETAILED DESCRIPTION

Items (e.g., products, objects, etc.) may be associated with formulas (e.g., recipes, specifications, procedures, techniques, plans, blueprints, processes, instructions, etc.) identifying components (e.g., constituents, elements, ingredients, parts, etc.), proportions (e.g., amounts, ratios, measures, etc.), and sequences (e.g., ingredient sequencing, order, ingredient ordering, progression, arrangement, series, etc.) to build the respective items. For example, the items may include beverages, food items, etc. that each may be associated with formulas identifying components to build the respective items. While the present disclosure may refer to beverages, recipes, and/or ingredients, it will be understood that the present disclosure may apply to any items, formulas, and/or components, respectively.

Beverages may be associated with standard (e.g., default, base, basic, etc.) recipes. Further, all or a portion of the standard recipes may be predetermined recipes with specific proportions, and sequences. For example, all or a portion of the standard recipes may be designed to yield a beverage with a particular taste or calorie count, a beverage that follows a particular dietary restriction, etc. based on the specific ingredients, proportions, and/or sequences. Further, the standard recipe may indicate that the beverage is to be built in a particular sequence (e.g., a particular sequence of operations using a particular sequence of ingredients) and output into a particular receptacle (e.g., container, cup, etc.) based on the yield of the beverage (e.g., a 20 oz. beverage may be output or designed for output into a large size cup, a 16 oz. beverage may be output or designated for output into a medium size cup, a 12 oz. beverage may be output or designated for output into a small size cup, etc.)

In traditional systems, in response to receiving a request for a beverage (e.g., via a beverage order), a human worker may identify the standard recipe and manually create the beverage by manually pumping ingredients from respective containers. However, in many cases, despite following the same recipe, manually creating beverages can result in inconsistent beverage compositions, at least in part because a 'pump' of an ingredient is not a precise volumetric measure.

Furthermore, users may request modifications (beverage modifications) to the standard recipe. Specifically, users may request an adjustment to the ingredients (e.g., syrup, sauce, or flavor), the amount of ingredients, the sequencing of the ingredients, etc. within a standard formula for a particular beverage. For example, a user may request half the sugar and twice the amount of vanilla flavor, as compared to the standard recipe for a particular beverage. Traditional pump systems may allow for a reduction or increase in a discrete number of manual pumps, but may not allow for a fraction of a pump of an ingredient to be pumped.

This may be problematic to the user experience, as a user may request more discrete customization and/or precise control of the beverage composition. Additionally, modifications may complicate beverage orders and further exacerbate the inconsistencies between beverages of the same recipe. For example, a user ordering the same beverage on multiple occasions may ultimately receive beverages with noticeably different beverage compositions, which can negatively affect the user's experience. In another example, users ordering the same beverage may ultimately receive beverages with noticeable different beverage compositions, which can cause a disparate experience for the users. Furthermore, because modifications to the recipe may unavoidably modify ingredient proportions, such modifications can undesirably detract from the original intent and/or flavor profile of the beverage.

In some cases, users may request beverages based on modifications to a standard recipe associated with the beverages. However, traditional systems may not identify and store the resulting modified recipe. As the beverage associated with the modified recipe may gain notoriety (e.g., fame, popularity, etc.), it may be problematic that traditional systems may be unable to recreate the beverage associated with the modified recipe as the traditional systems may be unable to capitalize on the associated notoriety. Further, traditional systems may be unable to recreate the modified recipe for users (e.g., the same user who originally requested the beverage or a different user). Additionally, as users iteratively request modifications to previously modified recipes, traditional systems may result in increasingly larger disparities between beverages.

The inconsistences resulting from manually creating beverages can result in inefficiencies within the traditional systems. For example, workers may be requested to remake beverages that are inconsistent with other beverages and/or issue refunds. Such a use of the systems to remake beverages and/or issue refunds may result in system inefficiencies as the systems may be required to process additional data to remake beverages and/or issue refunds. Further, such a use of the systems may result in system lag and additional power usage.

To address these or other concerns, disclosed herein is a system for maintaining a recipe data set (e.g., a recipe catalog) within a data store (e.g., a data base) and controlling a dispensing system to automatically (e.g., automatedly) dispense ingredients in accordance with a recipe identified by the recipe data set which may result in a more consistent beverage as compared to traditional systems. Improvements in the consistency of the beverages can increase the throughput and the efficiency of the system. For example, a change in throughput can modify the efficiency in which orders are prepared and delivered (e.g., as the system may not be required to remake beverages, issue refunds, etc.). By maintaining the recipe data set on a local data store and/or on a remote data store accessible to a fleet of dispensing systems via a network, the system can advantageously improve beverage uniformity amongst the fleet of dispensing systems. Furthermore, by automating the dispensing of ingredients, the system advantageously improves beverage quality and consistency.

The recipe data set may identify a plurality of recipes for different beverages. In some cases, the recipe data set may identify multiple recipes for the same beverage. All or a portion of the recipes may indicate a size of a beverage (e.g., small, medium, large, etc.), ingredients for the beverage, measures for all or a portion of the ingredients, operations for the beverage (e.g., mixing, stirring, blending, heating, chilling, shaking, resting, etc.), and/or a sequence for all or a portion of the ingredients and/or the operations (e.g., a sequence of adding ingredients, performing operations, etc.).

In some cases, all or a portion of the plurality of recipes may identify one or more automated dispensing systems to dispense one or more ingredients for a particular beverage. For example, a recipe for an americano may indicate that an automated espresso dispensing system is to dispense a particular number of espresso shots (the number of shots depending on the particular recipe). In another example, a recipe for a latte may indicate that an automated espresso dispensing system is to dispense a particular number of espresso shots (the number of shots depending on the particular recipe), an automated foamed milk dispensing system is to dispense a particular amount of foamed milk (the amount of foamed milk depending on the particular recipe), and an automated steamed milk dispensing system is to dispense a particular amount of steamed milk (the amount of steamed milk depending on the particular recipe).

Further disclosed is a system for dynamically generating beverage recipes in accordance with a formula generation policy (referred to herein as a recipe generation policy). The recipe generation policy can indicate how to adjust a recipe to compensate for modifications (modifiers). For example, modifications to a recipe for a beverage may include beverage modifications. The beverage modifications may include modifications to one or more ingredients (e.g., replacing dairy milk with almond milk), modifications to an amount of one or more ingredients (e.g., modifying the recipe such that it utilizes 2 shots of espresso instead of 1 shot of espresso), removal of one or more ingredients (e.g., modifying the recipe to remove steamed milk), addition of one or more ingredients (e.g., modifying the recipe to add caramel sauce), modifications to sequences to build the beverage, modifications to a receptacle for the beverage (e.g., insulated cup v. non-insulated cup, large cup v. medium cup, etc.), etc.

Consider a scenario in which a user requests an additional shot of espresso for her beverage. In such a scenario, simply adding the additional shot of espresso to the standard recipe, without further modifying the recipe, may result in a beverage with a slightly more bitter taste, as compared to a beverage produced based on the standard recipe. In such a scenario, the recipe generation policy may indicate a specific set of rules (e.g., parameters, guidelines, instructions, etc.) for adjusting the recipe to compensate for the increased bitterness introduced by the additional espresso shot. For example, the recipe generation policy may indicate to compensate for the espresso shot by adding chocolate sauce (for example, proportional to the volume of added espresso) to the recipe to counteract the bitterness of the espresso and removing steamed milked (for example, proportional to the volume of added espresso and chocolate sauce) from the recipe to compensate for the increased fluid volume. By dynamically generating recipes based on modifications, the system can advantageously preserve, within a modified recipe for a beverage, certain flavor profiles or qualities associated with a standard recipe for a beverage, notwithstanding the modifications.

Based on the modified recipe, the system can dynamically build (e.g., compile, generate, etc.) a set of computer-executable instructions for automated dispensing systems based on the modified recipe. In some cases, the system can identify the set of computer-executable instructions from a plurality of pre-built computer-executable instructions (e.g., based on the system building the set of computer-executable instructions for the modified recipe at a prior time).

In some cases, the system can store the modified recipe and/or the set of computer-executable instructions within a data store. For example, the system can store the modified recipe in a recipe data set in a data store. In some cases, based on receiving a request for a beverage to be built according to the modified recipe, the system can parse the data store to determine if the modified recipe and/or the set of computer-executable instructions is stored. For example, the system can parse the data store based on one or more of a received input, one or more modifications, a standard recipe, etc. If the system determines that the modified recipe and/or the set of computer-executable instructions is stored, the system may access the modified recipe and/or the set of computer-executable instructions and may not rebuild the modified recipe and/or the set of computer-executable instructions.

The system can communicate (e.g., route) at least a portion of the set of computer-executable instructions to the automated dispensing systems. The system may determine how to route the at least a portion of the set of computer-executable instructions (e.g., which portion to route, how to format the instructions, a timing of communicating the instructions, a timing for instructing the automated dispensing system to dispense an ingredient, etc.) to the automated dispensing systems. For example, the system may analyze the recipe to determine how to route the at least a portion of the set of computer-executable instructions to the automated dispensing systems. In some cases, the system can communicate different portions of the set of computer-executable instructions to different automated dispensing systems. In some cases, the system can communicate the same portion of the set of computer-executable instructions to multiple automated dispensing systems.

Based on communicating the computer-executable instructions, the system may cause the automated dispensing systems to build the beverage defined by the recipe. In some cases, the system may communicate instructions to move a beverage (e.g., a partially built beverage, a cup holding the partially built beverage, a cup, etc.) between automated dispensing systems to a worker (e.g., an automated worker, a human worker, etc.). Further, communicating the instructions to the worker may cause the worker to move the beverage between automated dispensing systems to build the beverage. In some cases, the instructions for the automated dispensing systems may include instructions to confirm that the beverage (e.g., a partially built beverage, a cup holding the partially built beverage, a cup, etc.) is in a particular position at the automated dispensing system (e.g., below a dispenser of the automated dispensing system) such that the automated dispensing systems can confirm a location of the beverage prior to dispensing an ingredient.

In light of the description herein, it will be understood that the embodiments disclosed herein substantially improve beverage quality and consistency across a fleet of dispensing systems by automating the dispensing of ingredients for recipes that may include any of thousands or millions of possible modifications/combinations. Specifically, the embodiments disclosed herein enable a system to receive orders, derive recipes (including, for example, ingredients, precise volumes of ingredients, and sequence instructions), modify the recipes, and facilitate precise, automated dispensing of a beverage in accordance with a derived recipe. The ability to derive recipes (for example, in real time or near real time) and facilitate automated dispensing of a beverage improves beverage quality and consistency by precisely dispensing the beverage ingredients in accordance with a derived recipe; reduces beverage-creation time, as less time is spent by workers measuring and/or manually pumping ingredients; and reduces complexity, memorization effort, and training burden, by reducing required recipe memorizations and mentally-performed recipe modifications. Furthermore, the automated dispensing system advantageously includes fewer plastic containers or pump assemblies, which advantageously reduces waste in the form of smaller packaging for ingredients, and reduces cleaning time for pumps and assemblies. Furthermore, by automating dispensing and improving precision, the system can improve the ability to determine and track detailed actuals for ingredient consumption, which advantageously reduces manual inventory counting and estimation, thereby improving accuracy in tracking inventory and planning for inventory restocking.

I. Environment Overview

FIG. 1 illustrates an embodiment of a beverage management and dispensing environment 100 that includes a network 102, an order management system 110, a product data system 120, and an automated dispensing system 130. To simplify discussion and not to limit the present disclosure, FIG. 1 illustrates only one order management system 110, product data system 120, and automated dispensing system 130, though multiple may be used.

Any of the foregoing components or systems of the environment 100 may communicate via the network 102. Although only one network 102 is illustrated, multiple distinct and/or distributed networks 102 may exist. The network 102 can include any type of communication network. For example, the network 102 can include one or more of a wide area network (WAN), a local area network (LAN), a cellular network (for example, LTE, HSPA, 3G, and other cellular technologies), an ad hoc network, a satellite network, a wired network, a wireless network, and so forth. In some embodiments, the network 102 can include the Internet.

Any of the foregoing components or systems of the environment 100, such as any one or any combination of the order management system 110, the product data system 120, or the automated dispensing system 130 may be implemented using individual computing devices, processors, distributed processing systems, servers, isolated execution environments (for example, virtual machines, containers, etc.), shared computing resources, or so on. Furthermore, any of the foregoing components or systems of the environment 100 may be combined and/or may include software, firmware, hardware, or any combination(s) of software, firmware, or hardware suitable for the purposes described. For example, in some cases, the product data system 120, or portions thereof (e.g., a formula manager (referred to herein as recipe manager 122) and/or the recipe catalog 124), may be integrated with the automated dispensing system 130.

A. Order Management System

The order management system 110 can receive user orders (sometimes referred to as beverage orders or orders) and communicate order information to an automated dispensing system 130 and/or a product data system 120. An order may be received by the order management system 110 from any of a variety of sources, such as from a worker entering a user order into a computing device in response to oral instructions from the user at a counter within a physical environment or via a drive-thru ordering system, a user entering a user order locally via an self-service kiosk, a user providing a user order via a user computing device (e.g., using a mobile order and pay software application, using an online ordering method, etc.), and/or any other source.

The order management system 110 may include, or interface with, a web browser, a mobile application or "app," a background process that performs various operations with or without direct interaction from a user, or a "plug-in" or "extension" to another application, such as a web browser plug-in or extension. In some cases, the order management system 110 may be hosted or executed by one or more host devices (not shown), which may broadly include any number of computing devices and/or virtual machine instances. Examples of an order management system 110 may include, without limitation, smart phones, point of sale systems, kiosks, tablet computers, handheld computers, wearable devices, laptop computers, desktop computers, servers, and so forth.

An order may include any of various order information including, but not limited to, a date, time, user name, a food identifier, a beverage identifier, or a modification(s). A beverage identifier can indicate the particular beverage that the user is ordering. For example, the beverage identifier can be any identifier that identifies a particular beverage or a standard recipe associated with that beverage. A beverage identifier can include, but is not limited to, a beverage name or an alphanumeric code (for example, an SKU) associated with the beverage or a recipe for the beverage. Similarly, a food identifier can indicate a particular food that the user is ordering.

As described herein, in some cases, a user orders a particular beverage and chooses modifications (e.g., ingredient modifications, sequence modifications, size modifications, operation modifications, etc.) to that beverage's standard recipe. The modifications may include an identifier of a particular component and a manner of modifying the particular component. For example, the modifications may include component modifications, component modifiers, component identifiers, etc. The order management system 110 can capture and/or analyze the order to identify those modifications. It will be understood that any modifiers or modifications may be utilized (e.g., sequence modifications, size modifications, operation modifications, ingredient modifications, beverage modifications, etc.).

A modification can indicate a modification to a standard recipe (or a modified recipe) associated with the particular beverage that the user is ordering. For example, the modification may indicate a modification to a previously modified recipe (indicative of a further modified recipe). The modification can provide an indication of an additional ingredient (for example, an extra shot of espresso), a modification to an existing ingredient (for example, almond milk instead of 2% milk), an absence of an existing ingredient (for example, no ice, no whipped cream, no sweetener, etc.), a modification to a sequence for the beverage (for example, adding ice to a beverage first, coffee to the beverage second, and sugar to the beverage third as compared to adding coffee to the beverage first, sugar to the beverage second, and ice to the beverage third), a modification to an operation for the beverage (for example, shaking the beverage as compared to stirring the beverage), a modification to a size of the beverage and/or a size of a cup for the beverage (for example, a small beverage in a large cup, a small beverage in a medium cup with the excess space occupied with ice, etc.), or the like. Accordingly, in some cases, the user's beverage order can be represented by a beverage identifier and/or one or more modifications.

B. Automated Dispensing System

An automated dispensing system 130 can include a base ingredient machine 132, a plurality of ingredient dispensers 134, a controller 136, and a data store 138. As described herein, the automated dispensing system 130 can automatedly dispense precise amount of ingredients in accordance with a particular recipe. For example, the controller 136 can obtain recipe information and can communicate instructions to the base ingredient machine 132 and/or the ingredient dispensers 134 to cause the base ingredient machine 132 and/or the ingredient dispensers 134 to dispense ingredients in accordance with a recipe information. For example, the base ingredient machine 132 and/or the ingredient dispensers 134 can include an electronic pump for facilitating precise distribution of the ingredient. The data store 138 (sometimes referred to as memory 138) can include or be implemented as cloud storage, such as Amazon Simple Storage Service (S3), Elastic Block Storage (EBS) or CloudWatch, Google Cloud Storage, Microsoft Azure Storage, InfluxDB, etc. The data store 138 can be made up of one or more data stores storing data similar to or the same as that of the recipe catalog 124, described herein.

C. Product Data System

The product data system 120 can include a recipe manager 122, a recipe catalog 124, and an inventory management system 126. As described herein, the product data system 120 may be implemented using individual computing devices, processors, distributed processing systems, servers, isolated execution environments (for example, virtual machines, containers, etc.), shared computing resources, or so on.

D. Recipe Manager

The recipe manager 122 can be used to manage, create, develop, or update recipes in the beverage management and dispensing environment 100. For example, the recipe manager 122 can maintain the recipe catalog 124 with recipe information. The recipe manager 122 can populate the recipe catalog 124 and/or update it over time with recipe information that receives and/or generates. As recipe information changes, the recipe manager 122 can update the recipe catalog 124. In this way, the recipe catalog 124 can retain an up-to-date database of recipe information.

In some cases, the order management system 110 and/or the automated dispensing system 130 can include a local data store 138 for storing recipe information. For example, the local data store 138 can include recipe information corresponding to recently created, developed, or updated orders associated with the order management system 110 and/or the automated dispensing system 130. In some cases, the recipe manager 122 can maintain the recipe catalog 124 by pinging the order management system 110 and/or the automated dispensing system(s) 130 for recipe information or passively receiving it based on the order management system 110 and/or the automated dispensing system(s) 130 independently reporting the recipe information. For instance, the recipe manager 122 can ping or receive information from the order management system 110 and/or the automated dispensing system(s) 130 at predetermined intervals of time, such as every X number of hours, or every X days, etc. In addition or alternatively, the order management system 110 and/or the automated dispensing system(s) 130 can automatedly send its recipe information to the recipe manager 122 and/or the recipe manager 122. In some cases, the recipe catalog 124 can be manually updated, such as by a beverage creator implemented recipe updates or new recipe rollouts.

Furthermore, the recipe manager 122 can transmit the recipe information to the order management system 110 and/or the automated dispensing system 130 via data packets, such as part of an update to some of all of the order management system 110 and/or the automated dispensing system(s) 130. For instance, the recipe manager 122 can communicate recipe updates to the automated dispensing system(s) 130 at predetermined intervals of time, such as every day, week, or month. In some cases, the recipe manager 122 provides the recipe information when the recipes, or updates thereto, become available from the recipe manager 122. In some cases, the recipe manager 122 provides the recipe information when a beverage creator further develops a recipe, or creates a test recipe. As another example, the automated dispensing system 130 can query the recipe manager 122 for recipe information, or can download recipe information from the recipe catalog 124.

E. Recipe Catalog

The recipe catalog 124 can store recipe information. In some embodiments, the recipe information can include beverage identifiers, ingredient identifiers, modifications, ingredient sequence instructions, etc. The recipe catalog 124 can be maintained (for example, populated, updated, etc.) by the recipe manager 122. As mentioned, in some embodiments, the recipe manager 122 and recipe catalog 124 can be separate or independent of the order management system 110 and/or the automated dispensing system 130. Alternatively, in some embodiments, the recipe manager 122 and/or recipe catalog 124 are part of the order management system 110 and/or the automated dispensing system 130. Furthermore, in some cases, the recipe catalog 124 can be separate from or included in, or part of, the recipe manager 122.

As described herein, a beverage identifier can be associated with a recipe for a beverage. A recipe can include a group of ingredients and/or a particular amount of each ingredient. Ingredients can include, but are not limited to, milk options (for example, 2%, nonfat, whole, breve, heavy cream, almond, coconut, oatmeal, soy), flavors (for example, apple brown sugar syrup, brown sugar syrup, caramel syrup, cinnamon dolce syrup, funnel cake syrup, hazelnut syrup, peppermint syrup, raspberry syrup, toffee nut syrup, vanilla syrup, or sugar free vanilla syrup), sauces (for example, mocha sauce, dark caramel sauce, pumpkin sauce, or white chocolate mocha sauce), add-ins (for example, chocolate malt powder or vanilla bean powder), sweeteners (for example, sugar, sugar in the Raw®, honey, Splenda®, stevia in the Raw®, classic syrup, cane sugar, or honey blend), etc.

Furthermore, a recipe can include a sequence of ingredients. For example, a recipe for a creamy coffee beverage could be to dispense hot espresso coffee extract into a cup, followed by two pumps of vanilla syrup, followed by a pump of white chocolate mocha sauce, followed by a fixed volume of steamed almond milk, and finished with two pumps of toffee nut flavor. The recipe for a non-creamy beverage could be the same ingredients and quantities but dispensed in a different order (for example, dispense a pump of white chocolate mocha sauce, followed by two pumps of vanilla syrup, followed by a fixed volume of steamed almond milk and followed with two pumps of toffee nut flavor and finished by dispensing a hot espresso coffee extract on top). Thus, different beverages can be made not only by varying the type and quantities of ingredients or modifiers (for example, sauces, syrups, and flavors), but also by changing the order in which they are added to the beverage.

The recipe catalog 124 can store one or more beverage identifiers. In some embodiments, the beverage identifiers can be implemented as alphanumeric identifiers or other identifiers that can be used to uniquely identify one beverage identifier from another beverage identifier stored in the recipe catalog 124.

In some cases, each beverage identifier can identify a particular beverage. As an example, the particular beverage associated with a beverage identifier can include, but is not limited to, Caffè Mocha, Caffè Latte, Caffè Americano, Pumpkin Cream Cold Brew, Iced Brown Sugar Oatmilk Shaken Espresso, Iced Peach Green Tea Lemonade, Honey Citrus Mint Tea, Nitro Cold Brew, or the like.

Furthermore, each beverage identifier can be associated with one or more of a beverage characteristic (for example, beverage size, a base beverage (tea, coffee, etc.)), a recipe, a group of recipe ingredients, one or more modifications, ingredient sequence instructions, and/or information regarding a recipe generation policy.

The recipe catalog 124 can include or be implemented as cloud storage, such as Amazon Simple Storage Service (S3), Elastic Block Storage (EBS) or CloudWatch, Google Cloud Storage, Microsoft Azure Storage, InfluxDB, etc. The recipe catalog 124 can be made up of one or more data stores storing data that has been received from one or more of the order management system 110, the automated dispensing system 130, or the recipe manager 122, or data that has been received directly into the recipe catalog 124. The recipe catalog 124 can provide high availability, highly resilient, low loss data storage. The recipe catalog 124 can include Amazon CloudWatch metrics. In some cases, to provide the high availability, highly resilient, low loss data storage, the recipe catalog 124 can store multiple copies of the data in the same and different geographic locations and across different types of data stores (for example, solid state, hard drive, tape, etc.). Further, as data is received at the recipe catalog 124 it can be automatically replicated multiple times according to a replication factor to different data stores across the same and/or different geographic locations.

In some cases, the recipe catalog 124 may not include or be implemented as storage and, instead, all or a portion of the recipe catalog 124 may be streamed (e.g., transmitted, pushed, etc.) to components (e.g., recipe managers) via a publish-subscribe model. For example, the recipe catalog 124 (including updates and/or revisions to the recipe catalog 124) may be streamed to a plurality of components associated with a plurality of physical environments. The publish-subscribe model may be implemented via a message mesh persistence and data streaming system and/or process (e.g., NATS Streaming, Apache Kafka, etc.). The recipe catalog 124 may be distributed and persisted according to the publish-subscribe model as messages to components in real time across one or more networks and/or physical systems. The recipe catalog 124 may be persisted across a plurality of components such that each of the components has access to the same recipes (including modified recipes). Further, updates and/or additions to the recipe catalog 124 may be automatically persisted, in real time, to all or a portion of the plurality of components.

In some cases, in response to requests for beverages corresponding to particular recipes, associated computer-executable instructions may be built and streamed to one or more automated dispensing systems via a message mesh persistence and data streaming system and/or process. For example, the computer-executable instructions may be automatically built and transmitted to the one or more automated dispensing systems.

A non-limiting example of a data structure for storing the recipe information is illustrated in Table 1.

TABLE 1

| Beverage Identifier | Beverage Name | Size | Ingredient Identifier | Ingredient Amount | Modification |
|---|---|---|---|---|---|
| 65 | Caffè Mocha | Grande | hot espresso | 2 fluid ounces | |
| | | | mocha sauce | 4 fluid ounces | |
| | | | steamed 2% milk | 8 fluid ounces | |
| 66 | Caffè Mocha | Grande | hot espresso | 3 fluid ounces | +1 ounce |
| | | | mocha sauce | 4 fluid ounces | |
| | | | steamed almond milk | 7 fluid ounces | almond |

With reference to the example in Table 1, the beverage identifier 65 is associated with the beverage name "Caffè Mocha" and beverage size "Grande." In addition, the beverage identifier 65 is associated with a plurality of ingredient identifiers (hot espresso, mocha sauce, steamed 2% milk) and a plurality of corresponding ingredient amounts (2 fluid ounces, 4 fluid ounces, 8 fluid ounces). In this example, the associated ingredients and ingredient amounts correspond to the recipe for the beverage. Furthermore, in this example, the beverage identifier 65 is not associated with any modifications. In some cases, a beverage that is not associated with any modifications is referred to as a "standard" or default beverage. Thus, in this example, the beverage identifier 65 can correspond to the standard beverage recipe the Grande Caffè Mocha.

Table 1 also includes a row for the beverage identifier 66. Similar to the beverage identifier 65, the beverage identifier 66 is also associated with the beverage name "Caffè Mocha" and beverage size "Grande." However, the beverage identifier 66 is additionally associated with several modifications, namely "+1 ounce" of espresso and a replacement of "2%" milk with "almond" milk. Looking at both of these examples in Table 1, note that the total aggregate volume of ingredients is 14 ounces, despite beverage identifier 65 being associated with an additional ounce of espresso. This is due to the recipe have a reduced the volume of milk in response to an increase in the volume of expresso.

It will be understood that the beverage identifier entries can be configured in a variety of ways. It will be understood that the beverage identifier data structure can include fewer or additional information. For example, sequence instructions for the recipe can be included or beverage sizes may be omitted, etc.

F. Inventory Management System

The inventory management system 126 can be used to manage, track, or order inventory at one or more physical environments. For example, as mentioned, the automated dispensing system 130 can dispense precise amounts of ingredients. Due to the precision, a precise amount of leftover ingredients can be determined and/or tracked. As additional ingredients are used, the inventory management system 126 can update to reflect the change. In this way, the inventory management system 126 can improve the ability to determine and track detailed actuals for ingredient consumption, which advantageously reduces manual inventory counting and estimation, thereby improving accuracy in tracking inventory and planning for inventory restocking. In some cases, the inventory management system 126 is implemented as part of the automated dispensing system 130.

II. Example Automated Dispensing System

Figure 2:
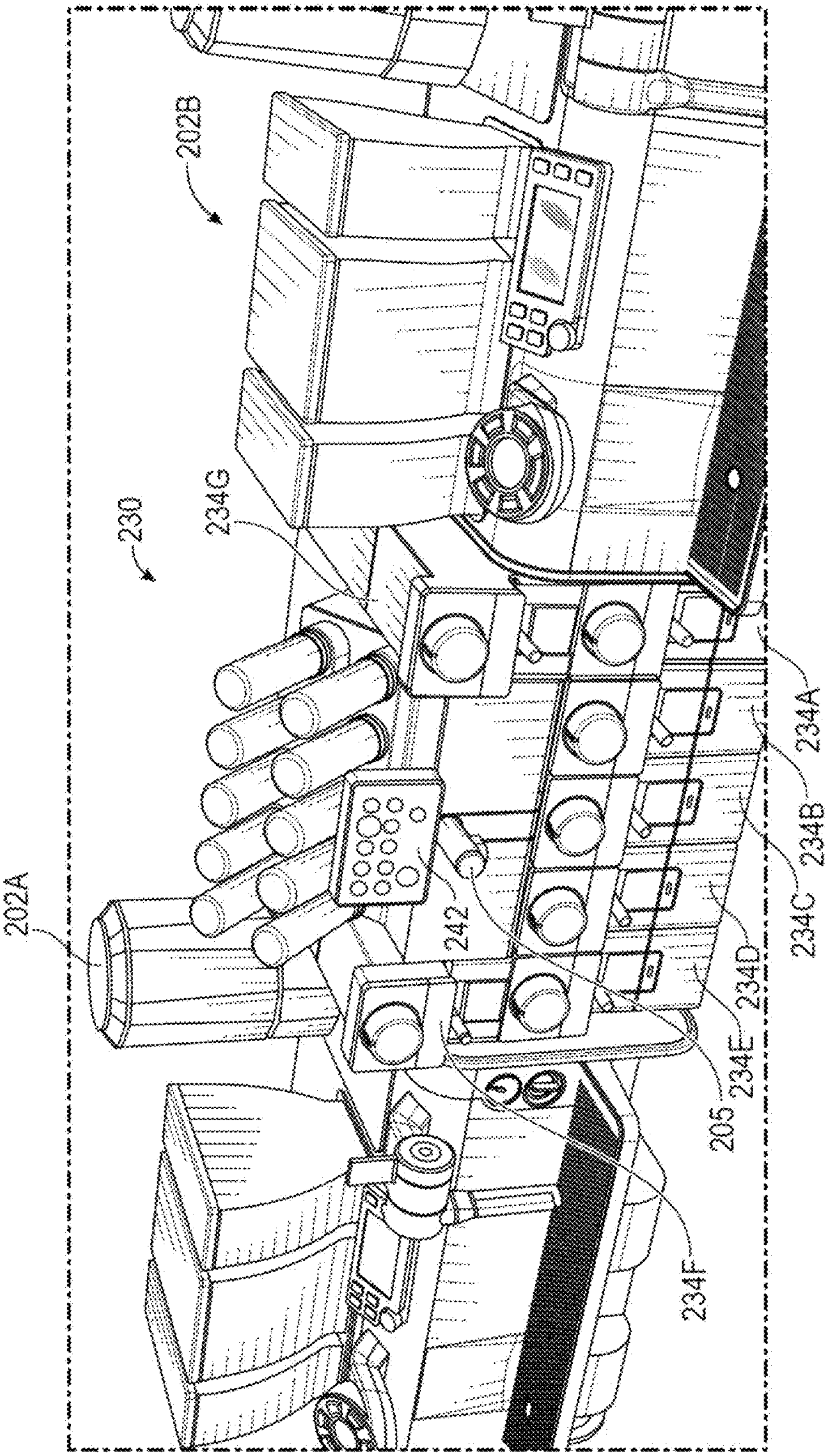
FIG. 2 illustrate an example automated dispensing system.

FIG. 2 illustrates an example automated dispensing system 230 for automatedly dispensing beverage ingredients in accordance with a recipe. The automated dispensing system 230 includes a base ingredient machine 202A, 202B, a plurality of dispensers 234A, 234B, 234C, 234D, 234E, 234F, 234G (individually or collectively referred to as dispenser 234 or dispensers 234), a dispenser spout 205, a display screen 242, and/or a controller (such as controller 136 of FIG. 1). The automated dispensing system 230 may be an embodiment of the automated dispensing system 130 of FIG. 1.

The base ingredient machine 202A, 202B can brew or dispense a base ingredient, such as espresso, coffee, tea, etc. For example, a base ingredient machine 202A, 202B can include, but is not limited to, a coffee espresso machine or a tea machine. It will be understood that the base ingredient machines 202A, 202B of FIG. 2 merely represent examples and thus FIG. 2 should not be construed as limiting.

The dispenser spout 205 can dispense a liquid, such as hot or cold water, an ingredient or combination of ingredients, or a prepared beverage. In some cases, the dispenser spout 205 may facilitate manual dispensing, for example by a worker (e.g., a human worker, a robotic device, etc.). In some cases, the dispenser spout 205 facilitates automated dispensing, such as described herein. The dispenser spout 205 may be a centralized dispenser spout, such that the dispenser spout 205 can dispense some or all of a set of ingredients. In addition or alternatively, the dispenser spout 205 may dispense a single ingredient. For example, the automated dispensing system 230 may include a plurality of dispenser spouts 205, such as one for each ingredient.

The display screen 242 may include a touchscreen display that can receive user input based on pressing of graphical buttons or icons on a graphical user interface of the display screen 242, in addition to displaying graphics, animations, or alphanumeric textual information to the worker. In addition or alternatively, the display screen 242 can display information or instructions to the worker or other user, such as indications of errors, warnings, or alerts, instructions for a recipe, or other beverage information.

The dispensers 234 may be controlled from, or by, one or more controllers. For example, the individual dispensers 234 may be controlled from, or by, a single centralized controller that supplies power and control signals (which may include data or other information, such as recipe information) to each of the dispensers 234. In other configurations, each dispenser 234 may be controlled by its own dedicated local controller or subgroups of dispensers may be controlled by a controller. Each dispenser 234 can be changed or adapted to dispense any ingredient by changing certain pump characteristics or dispensing parameters (for example, the pump speed, timing, volumetric dispensation, and algorithm of dispensing).

In some cases, the dispensers 234 are modular. For example, the dispensers 234 can be added to or removed from the automated dispensing system 230 quickly and easily in different configurations without negatively affecting the other dispensers 234 or the operation of the automated dispensing system 230.

The dispense instructions (for example, amount dispensed) may be input by an individual worker through a user input device (for example, the display screen 242) on the dispenser or remote from the dispenser, for example if the dispense instructions deviate from a standard recipe for the beverage. Alternatively, the dispense instructions may be automatically received by the automated dispensing system 230 from the order management system 110 or the product data system 120. Even when the dispense instructions are received from the order management system 110 or the product data system 120, the user (for example, a worker) may be able to modify the dispense instructions manually (for example, if a user changes their mind after an initial time of sale).

It will be understood that the automated dispensing system 230 can include fewer or more components, as desired. For example, the automated dispensing system 230 can be an embodiment of the automated dispensing system described in greater detail in U.S. Pub. No. 2021/0221667, filed Jan. 14, 2021, entitled "AUTOMATED DISPENSING SYSTEM FOR CUSTOMIZED BEVERAGES," which is hereby incorporated by reference in its entirety and includes concepts that are compatible with and can be used in conjunction with any combination of the embodiments and/or features described herein.

III. Generating a Recipe for a Modified Version of a Beverage

Figure 3:
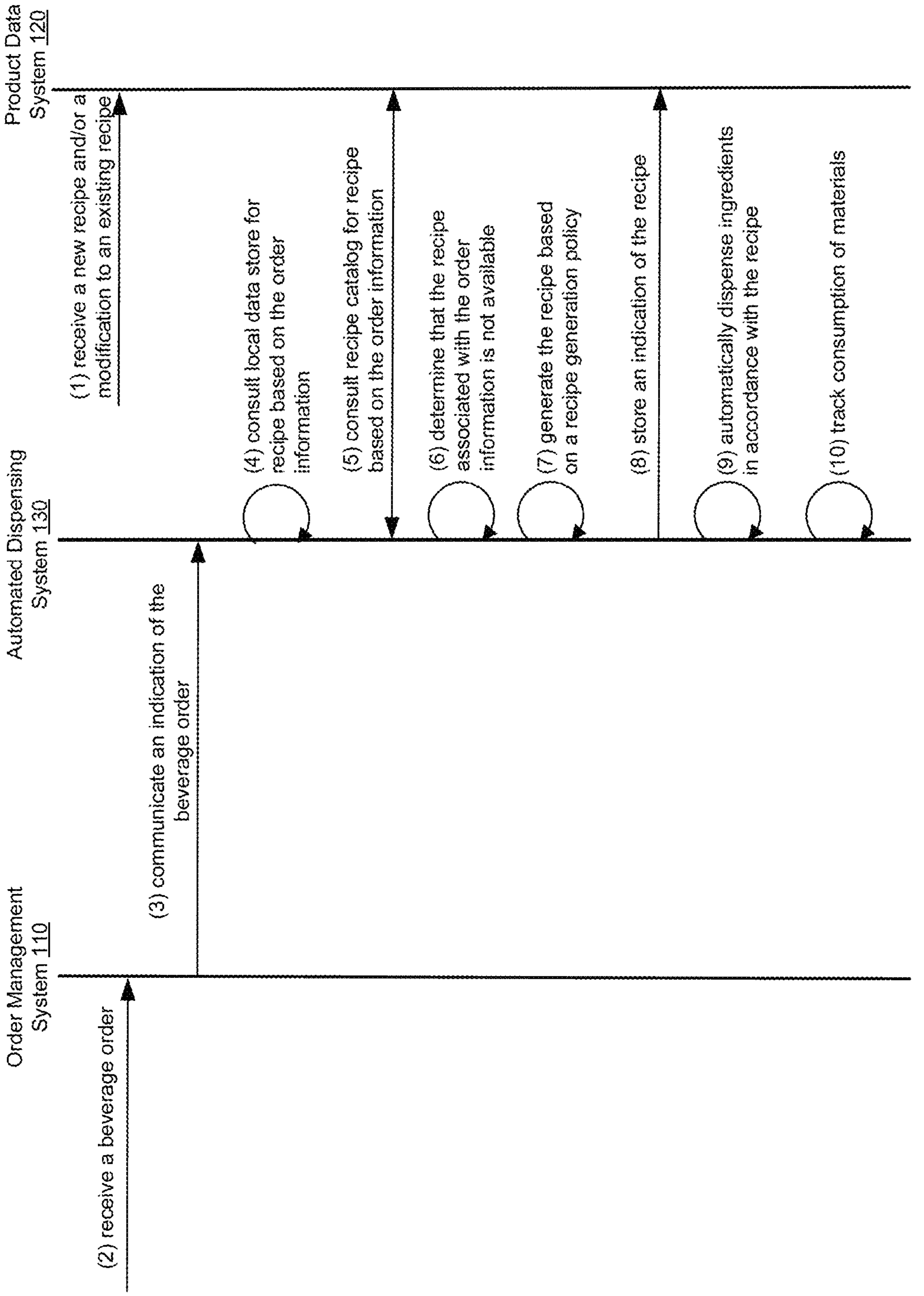
FIG. 3 is a data flow diagram illustrating an embodiment of a data flow and communications between a variety of the components of the beverage management and dispensing environment to dynamically generate a formula for a beverage in accordance with a formula generation policy.

FIG. 3 is a data flow diagram illustrating an embodiment of the data flow and communications between a variety of the components of the beverage management and dispensing environment 100 to dynamically generate a recipe for a beverage in accordance with a recipe generation policy. The data flow diagram of FIG. 3 illustrates an example of data flow and communications between an order management system 110, a product data system 120 (e.g., the inventory management system 126, the recipe manager 122, and/or the recipe catalog 124), and an automated dispensing system 130. However, it will be understood, that in some of embodiments, one or more of the functions described herein with respect to FIG. 3 can be omitted, performed concurrently or in a different order and/or performed by a different component of the beverage management and dispensing environment 100. Accordingly, the illustrated embodiment and description should not be construed as limiting.

At (1), the product data system 120 receives a new recipe and/or an update or modification to an existing recipe. As described herein, the product data system 120 can include a recipe catalog 124 that stores recipe information, such as recipe identifiers (e.g., beverages names or SKUs) and associated ingredients, ingredient amounts, sequence instruction, etc. In some cases, a beverage creator can interact with the product data system 120 to communicate the new recipe and/or an update or modification to an existing recipe. For example, the beverage creator can introduce or activate seasonal recipes, trial or test recipes, modifications to recipes, etc. The recipe manager 122 can update the recipe catalog 124 with this information. Furthermore, in some cases, some or all of the contents of the recipe catalog 124 can be communicated to one, some, or all of the automated dispensing systems 130.

At (2), the order management system 110 receives a beverage order for a first beverage. The beverage order can be received by the order management system 110 from any of a variety of sources, such as from a worker entering a user order into a computing device in response to oral instructions from the user at a counter within a physical environment or via a drive-thru ordering system, a user entering a user order locally via an self-service kiosk, a user providing a user order via a user computing device (e.g., using a mobile order and pay software application, using an online ordering method, etc.), and/or any other source.

At (3), the order management system 110 communicates an indication of the beverage order to an automated dispensing system 130. In some cases, to communicate the order to the automated dispensing system 130, the order management system 110 receives the order and forwards order information to the automated dispensing system 130.

At (4), the automated dispensing system 130 determines whether a recipe associated with the order information is available in local storage (e.g., data store 138) and/or remote storage (e.g., recipe catalog 124). For example, as described herein, the automated dispensing system 130 can include and/or maintain a local data store 138 that includes a group of recipes, such as a copy of recent information stored in the recipe catalog 124. Using the order information, the automated dispensing system 130 can consult its local data store 138 to determine whether an associated recipe is available. For example, the automated dispensing system 130 can compare at least some of the order data to data stored in the local data store 138 to determine whether an associated order is available. In some cases, if the recipe is available in the local data store 138, the automated dispensing system 130 can identify the recipe and proceed to interaction (9), where the automated dispensing system 130 dispenses the beverage.

In some cases, if the recipe is unavailable in the local data store 138, then the automated dispensing system 130 can check the recipe catalog 124 for the recipe. For example, at (5), the automated dispensing system 130 communicates a request or query for the recipe to the recipe manager 122, for example via data packets. In some cases, as part of the request, the automated dispensing system 130 communicates at least some of the order information, such as the beverage identifier and the modification(s). In some cases, as part of the request, the automated dispensing system 130 communicates all of the order information. In some cases, the communication of the order information (or portion thereof) can itself function as the request, so a separate request need not be sent. In some cases, the automated dispensing system 130 consults the recipe catalog 124 before or instead of consulting its local data store 138.

At (6), the automated dispensing system determines that a recipe associated with the order information is not available.

At (7), the automated dispensing system 130 generates the recipe based on order information and a recipe generation policy. For example, as mentioned, the information can include data, such as a beverage identifier and one or more modifications. As part of generating the recipe, the automated dispensing system 130 can use the beverage identifier to obtain the standard recipe from the data store 138. Furthermore, the automated dispensing system 130 can obtain a recipe generation policy, which can be stored in the data store 138 as well. As described herein, to generate the recipe, the automated dispensing system 130 can make modifications to the standard recipe (or another recipe) based on the modification(s) and/or the recipe generation policy.

The recipe generation policy can indicate how to adjust or create a recipe in response to modifications. For example, the recipe generation policy can include a particular set of rules or instructions relating to how to modify the ingredients, the ingredient amounts, the ingredient order, etc. so that the modification is implemented and/or other criteria (for example, flavor profile, calorie count, dietary restriction, volume threshold, etc.) are satisfied.

In some cases, the recipe generation policy indicates that the total volume of the ingredients should satisfy a volume threshold. For example, if the modification indicates the presence of an additional ingredient or an increased amount of an existing ingredient as compared to a standard recipe, the recipe generation policy can indicate to reduce at least one existing ingredient such that the total volume of the new recipe does not exceed a volume threshold. As another example, if the modification indicates the absence of an existing ingredient or a decreased amount of an existing ingredient as compared to a standard recipe, the recipe generation policy can indicate to increase at least one existing ingredient such that the total volume of the new recipe does not exceed a volume threshold. The particular ingredient(s) that are increased or decreased can be determined using a plurality of techniques. For example, in some cases, the particular ingredient can be the main ingredient, such as the ingredient with the largest volume according to the standard recipe. As another example, in some cases, the particular ingredient can be the complementary to the modified ingredient. For example, if a relatively bitter ingredient (for example, espresso) is added, then a similarly bitter ingredient can be removed and/or a sweet ingredient (for example, mocha sauce) can be added to compensate for the likely change in taste.

The volume threshold can vary across embodiments. For example, the volume threshold can be based on a size of the cup (for example, small, medium, large), the presence of absence of particular ingredients (for example, whipped cream), user preference, etc. For example, in some cases, a size small cup holds approximately 12 oz. of fluid. In some such cases, the volume threshold can be approximately 12 oz. Alternatively, the volume threshold may be some offset (for example, 0.25, 0.5, or 1 oz.) from 12 oz., so that the cup does not overflow or spill. As another example, if modified recipe includes whipped cream, the volume threshold can be reduced, for example to leave enough room for the whipped cream to be added after the beverage is prepared.

In some cases, the recipe generation policy indicates how to compensate for particular ingredients so that the beverage substantially retains its flavor profile, as compared to the standard recipe. Consider a scenario in which a user requests an additional shot of espresso for her beverage. In such a scenario, simply adding the additional shot of espresso to the standard recipe, without modifying the other ingredients of the recipe, may result in a beverage with a more bitter taste, as compared to the standard recipe. Accordingly, the recipe generation policy may indicate a specific set of rules for compensating for the increased bitterness introduced by the additional espresso shot. For example, the recipe generation policy may indicate to compensate for the espresso shot by adding chocolate sauce (or other flavor in the standard recipe) and/or removing steamed milked (for example, proportional to the volume of added espresso and chocolate sauce). By dynamically generating beverage recipes based on modifications, the system can advantageously preserve the flavor profile or quality of a beverage, notwithstanding the modifications.

In some implementations, the recipe generation policy indicates to change all of the ingredients proportionally, in response to the presence of an additional ingredient or absence of an existing ingredient. Consider a scenario in which a standard beverage includes: 3.5 oz. steamed milk, 2 oz. chocolate sauce, and 2 oz. espresso. Further, consider that the modification indicates an additional shot of espresso. For such a scenario, the recipe generation policy can indicate to decrease the steamed milk and the chocolate sauce proportionally to account for the additional 1.5 oz. of espresso, such that the generated recipe includes approximately 2.54 oz. steamed milk, 1.45 oz. chocolate sauce, and 3.5 oz. espresso. The recipe generation policy can indicate similar proportional adjustments when ingredients are removed from the standard recipe.

In some cases, the recipe generation policy indicates make the adjustment to the recipe is accordance with the modification, but make no other adjustments to the ingredients. For example, returning to the example above in which a standard beverage includes: 3.5 oz. steamed milk, 2 oz. chocolate sauce, and 2 oz. espresso, and the modification indicates an additional shot of espresso, the recipe generation policy can indicate to retain all original ingredients, such that the generated recipe includes approximately 3.5 oz. steamed milk, 2 oz. chocolate sauce, and 3.5 oz. espresso. In some such cases, this may require the system to utilize a larger cup (for example, the next size up) when dispensing the beverage.

At (8), the automated dispensing system 130 stores an indication of the generated recipe in the data store 138 and/or in the recipe catalog 124. As described herein, the automated dispensing system 130 can maintain the data store 138 with up-to-date recipe information. Similarly, the recipe manager 122 can maintain the recipe catalog 124 with up-to-date recipe information. Accordingly, in some cases, each time the automated dispensing system 130 generates a new recipe, the automated dispensing system 130 can populate the data store 138 and/or the recipe catalog 124 with the generated recipe. In some cases, as part of populating the generated recipe, the automated dispensing system 130 can generate a beverage identifier associated with the generated recipe. Furthermore, as described herein, the data store 138 and/or the recipe catalog 124 can store associations between beverage identifiers, recipes, modifications, etc. By storing the generated recipe, if the order occurs again, the automated dispensing system 130 can retrieve the recipe information, rather than regenerating the recipe. Furthermore, by storing generated recipes, recipe "gaps" are filled.

At (9), the automated dispensing system 130 automatedly dispenses the ingredients in accordance with the generated recipe. As described herein, the automated dispensing system 130 can include a controller 136, one or more ingredient dispensers 134, and/or a base ingredient machine 132. Each ingredient dispenser 134 can store one or more ingredients, and can be controlled by the controller 136 to dispense a precise amount of the respective ingredient. The controller 136 obtains the recipe and communicates instructions to the respective ingredient dispensers 134 (for example, to a dispenser pump) based on the recipe. The pumps in the ingredient dispensers 134 then dispense the exact volume of ingredient into a vessel through a dispensing spout.

At (10), the automated dispensing system 130 tracks consumption of materials based at least in part on the dispensing of the ingredients in accordance with the generated recipe. As mentioned, by improving precision of the dispensing system 130, the precise amounts of utilized ingredients can be determined and tracked. In this way, the automated dispensing system 130 can improve the ability to determine and track detailed actuals for ingredient consumption, which advantageously reduces manual inventory counting and estimation, thereby improving accuracy in tracking inventory and planning for inventory restocking. In some cases, the product data system 120 (e.g., the inventory management system 126) can track the inventory and/or managed automated order of additional supplies based on the inventory tracking.

It will be understood that the various interactions described with respect to FIG. 3 can be implemented in a variety of orders and/or can be implemented concurrently or in an altered order, as desired. For example, in some cases, the automated dispensing system 130 can concurrently store the recipe information in the data store 138 and the recipe catalog 124. In some cases, the data flow of FIG. 3 occurs in real-time or near-real time. In this way, the recipe is generated and/or the beverage dispensed without causing a significant delay for the user.

Furthermore, it will be understood that fewer, more, or different blocks can be used as part of the data flow of FIG. 3. For example, in some cases, the data of the recipe catalog 124 is available for download by the automated dispensing system 130, or the data of the recipe catalog 124 may be part of a software update that the recipe manager 122 periodically distributes to the automated dispensing system(s) 130. In this way, in some cases, the data stored locally on the automated dispensing system 130 is the same as the data stored in the recipe catalog, and thus interaction (4) may be omitted.

As another example, in some cases, the automated dispensing system 130 may performed one or more of interactions (4), (5), or (6). For example, the automated dispensing system 130 may store the recipe generation policy and thus can generate a recipe itself, without having to interaction with the recipe manager 122. In some such cases, the automated dispensing system 130 can communicate an indication of the generated recipe to the recipe manager 122, so that the recipe manager 122 can update the recipe catalog 124.

IV. Managing a Recipe Catalog

Figure 4:
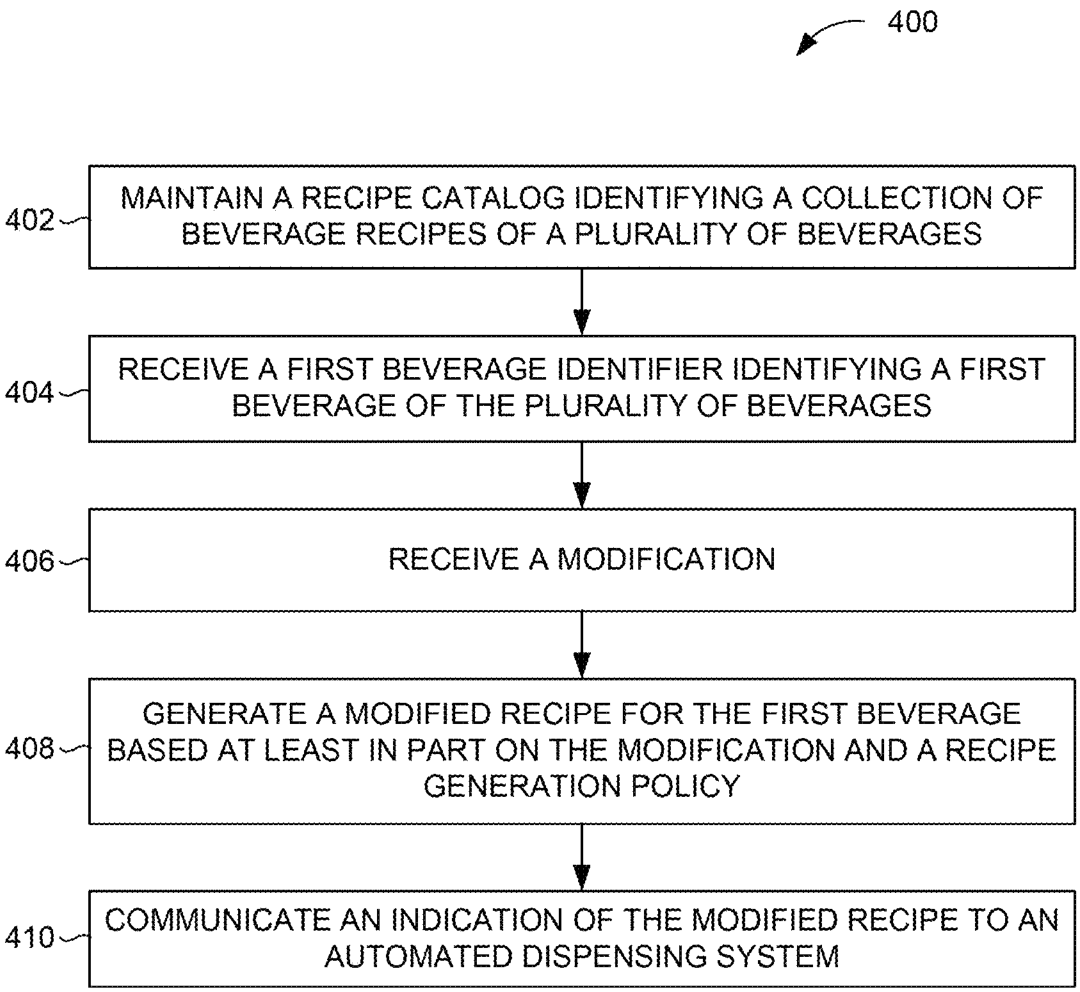
FIG. 4 is a flow diagram illustrative of an embodiment of a routine implemented by the formula manager to dynamically generate a formula for a beverage in accordance with a formula generation policy.

FIG. 4 is a flow diagram illustrative of an embodiment of a routine 400 implemented by the recipe manager 122 to dynamically generate a recipe for a beverage in accordance with a recipe generation policy. Although described as being implemented by the recipe manager 122, it will be understood that the elements outlined for routine 400 can be implemented by one or more computing devices or components that are associated with the beverage management and dispensing environment 100, such as, but not limited to, the product data system 120, the recipe catalog 124, the order management system 110, or the automated dispensing system 130. Thus, the following illustrative embodiment should not be construed as limiting.

At block 402, the recipe manager 122 maintains the recipe catalog 124. In some cases, the recipe manager 122 maintains the recipe catalog 124 by communicating with some or all of the automated dispensing systems 130 or the order management system 110. For example, in some cases, an automated dispensing system 130 and/or an order management system 110 can obtain or manage recipe information, such as indications of available ingredients, user-created recipes, and/or modifications, etc. The recipe manager 122 can receive the recipe information and use it to update and/or maintain the recipe catalog 124. In certain embodiments, the recipe manager 122 can communicate with the automated dispensing system 130 and/or the order management system 110 to receive recipe information, from which it can determine additional recipes or modifications, and can use that information to maintain the recipe catalog 124.

In some cases, the recipe manager 122 communicates with the automated dispensing systems 130 and/or the order management system 110 by pinging them and receiving a response. For instance, the recipe manager 122 can ping the automated dispensing systems 130 at predetermined intervals of time, such as every 60 seconds, or every 30 or 60 minutes, or every 4, 8, or 12 hours, etc. In certain embodiments, the automated dispensing systems 130 can automatically send recipe data to the recipe manager 122.

The recipe catalog 124 can include, among other things, a collection of beverage recipes for a plurality of beverages. For example, for each beverage, the recipe catalog 124 can include a standard recipe associated with a collection of ingredients and corresponding amounts of each ingredient. In some cases, the recipe catalog 124 includes multiple standard recipes for a particular beverage, such as a different standard recipe for each available size of the beverage. In some cases, for a particular beverage, the ingredients and/or ingredient proportions are the same between beverage sizes. Alternatively, the ingredients and/or ingredients proportions may vary across beverage sizes. Ingredients can include, but are not limited to, sauces, syrups, sweeteners, colors, flavors, ice, water, dairy or non-dairy products, espresso, whipped cream, etc.

In some cases, the recipe information includes one or more modified recipes. A modified recipe can be an altered version of a standard recipe, such as a version with additions or subtractions as compared to the respective standard recipe. In some cases, the modified recipes are associated with modifications. For example, as described herein, a modification can indicate the addition or removal of an ingredient, as compared to a standard recipe.

At block 404, the recipe manager 122 receives a first beverage identifier identifying a first beverage of the plurality of beverages in the recipe catalog 124. As described herein, the first beverage can correspond to a beverage that is associated with a standard or default recipe. For example, the recipe manager 122 can look up the first beverage identifier in the recipe catalog 124 to determine various information associated with the beverage, such as the recipe information, the ingredients, the beverage name, etc.

At block 406, the recipe manager 122 receives a modification. As described herein, the modification can indicate a modification of the standard beverage. For example, the modification can indicate the addition of a new ingredient (and the amount of the addition) to the recipe. As another example, the modification can indicate the addition of an existing ingredient (and the amount of the addition) to the recipe (e.g., adding more of an existing ingredient to the recipe). As another example, the modification can indicate the reduction or removal of an existing ingredient (and the amount of the reduction) from the recipe. As another example, the modification can indicate the replacement of an existing ingredient with another ingredient. As another example, the modification can indicate a change in sequence (e.g., operation sequence, ingredient sequence, etc.) for the beverage (e.g., modifying the recipe such that adding syrup is a last step of the recipe instead of a first step of the recipe). In a particular example, a user may request an "upside down" beverage (e.g., requesting a reversal of the sequence of ingredients and/or operations in a recipe for a beverage (e.g., a latte, a macchiato, etc.)). For example, in a standard recipe for a beverage, espresso may be added first followed by steamed milk second, and in a modified recipe for the same beverage, the steamed milk may be added first followed by espresso second. As another example, the modification can indicate operations for the beverage (e.g., removing a blending operation from the recipe and adding a mixing operation). As another example, the modification can indicate a size for the beverage. Although described as a single modification, it will be understood that any number of modifications can be received, for example based on the beverage order.

At block 408, the recipe manager 122 generates a modified recipe for the first beverage. As described herein, the recipe manager 122 generates the modified recipe based at least in part on the first beverage identifier, the modification, and a recipe generation policy. The recipe generation policy can include a specific set of rules or instructions for modifying the ingredients to implement the modification(s). As described herein, the recipe generation policy can vary across embodiments. For example, in some cases, the recipe generation policy indicates that an aggregate volume of the standard ingredients should be equal to an aggregate volume of the modified ingredients. As another example, in some cases, the recipe generation policy indicates to retain the particular ingredient proportions from the standard recipe when generating the modified recipe.

At block 410, the recipe manager 122 communicates the modified recipe to an automated dispensing system 130. The automated dispensing system 130 can automatedly dispense the ingredients in accordance with the modified recipe. As described herein, the automated dispensing system 130 can include a controller 136, one or more ingredient dispensers 134, and/or a base ingredient machine 132. Each dispenser 134 can store one or more ingredients, and can be controlled by the controller 136 to dispense a precise amount of the respective ingredient. The controller 136 obtains the recipe and communicates instructions to the respective dispensers 234 (for example, to a dispenser pump) based on the recipe. The pumps in the dispensers 234 then dispense the exact volume of ingredient into a vessel through a dispensing spout.

V. Building Beverages

Figure 5:
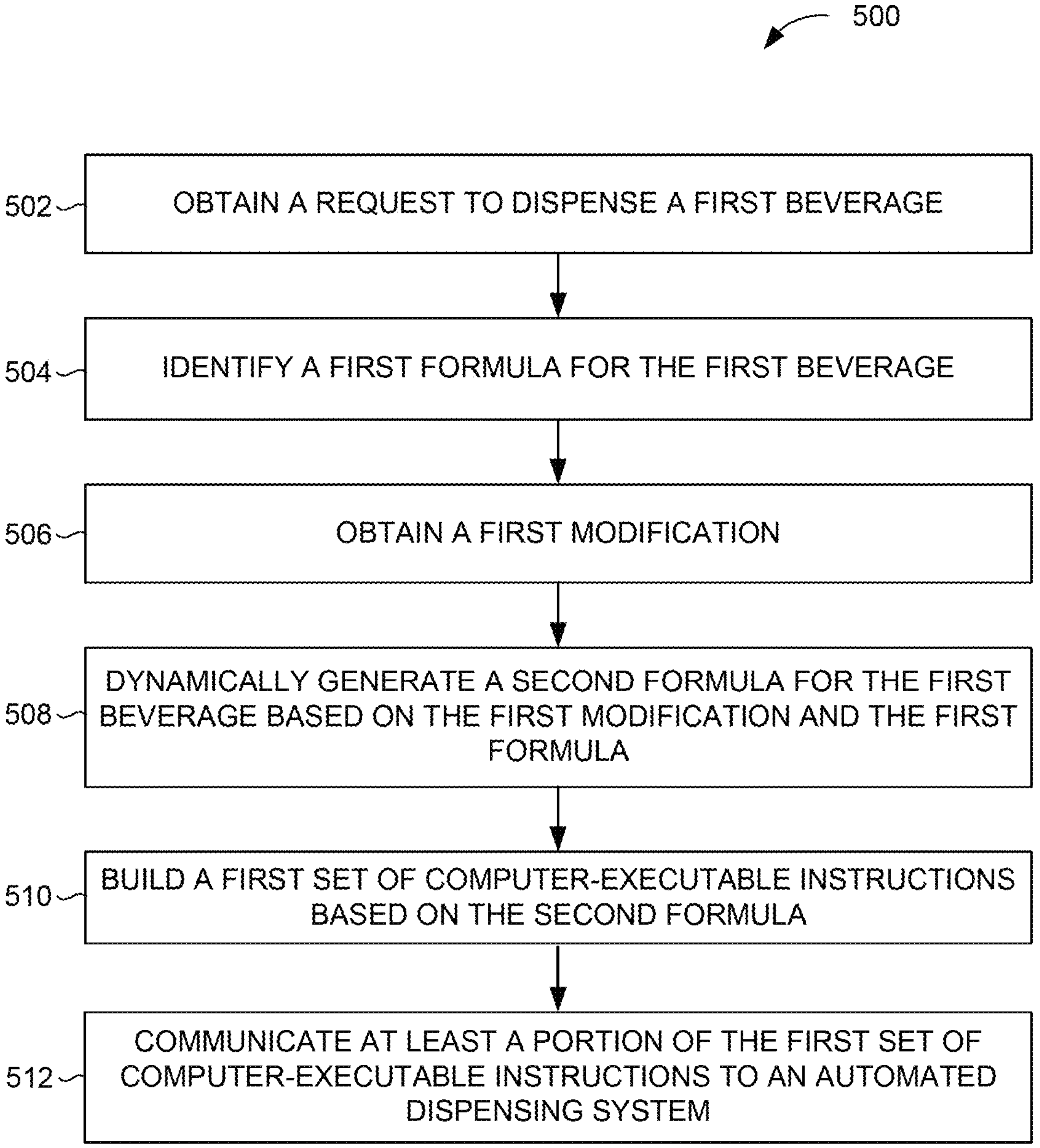
FIG. 5 is a flow diagram illustrative of an embodiment of a routine implemented by the formula manager to dynamically generate a formula for a beverage and build the beverage.

FIG. 5 is a flow diagram illustrative of an embodiment of a routine 500 implemented by the recipe manager 122 to dynamically generate a recipe for a beverage. Although described as being implemented by the recipe manager 122, it will be understood that the elements outlined for routine 500 can be implemented by one or more computing devices or components that are associated with the beverage management and dispensing environment 100, such as, but not limited to, the product data system 120, the recipe catalog 124, the order management system 110, or the automated dispensing system 130. Thus, the following illustrative embodiment should not be construed as limiting.

At block 502, the recipe manager 122 obtains a request to dispense a first beverage. For example, the recipe manager 122 may obtain a request to dispense a first beverage within a physical environment. In some cases, the recipe manager 122 may obtain the request via a user order (e.g., received from a user computing device).

At block 504, the recipe manager 122 identifies a first formula (e.g., recipe) for the first beverage. The first formula may indicate a first group of components (e.g., a first plurality of ingredients) of the first beverage, one or more respective measures (ratios, amounts, etc.) associated with the components of the first group of components, and/or one or more first sequences of the first group of components to dispense to build the first beverage. In some cases, the first formula may indicate one or more automated dispensing systems for the first formula. The one or more automated dispensing systems may include at least one of a sauce dispensing system, a syrup dispensing system, an espresso dispensing system, a drip coffee dispensing system, a cold brew coffee dispensing system, a coffee infused with nitrogen dispensing system, a steamed milk dispensing system, a dairy milk dispensing system, a non-dairy milk dispensing system, a hot water dispensing system, a juice dispensing system, or a mixed beverage dispensing system.

At block 506, the recipe manager 122 obtains a first modification. The first modification may indicate a modification to a respective component of the first group of components, a modification to a measure associated with a respective component of the first group of components, a removal of a component from the first group of components, and/or an addition of a component to the first group of components.

At block 508, the recipe manager 122 dynamically generates a second formula (e.g., recipe) for the first beverage based on the first modification and the first formula. The second formula may indicate a second group of components (e.g., a second plurality of ingredients) of the first beverage, one or more respective measures associated with the components of the second group of components, and/or one or more second sequences of the second group of components to dispense to build the first beverage. The one or more first sequences and the one or more second sequences may be the same or different sequences. For example, the one or more first sequences may indicate that a first component is to be dispensed prior to a second component and the one or more second sequences may indicate the second component is to be dispensed prior to the first component. In some cases, the second formula may indicate one or more automated dispensing systems for the second formula.

In some cases, the recipe manager 122 may determine one or more nutritional values associated with the first beverage. For example, the recipe manager 122 may determine one or more first nutritional values associated with the first beverage based at least in part on the first formula and may determine one or more second nutritional values associated with the second beverage based at least in part on the second formula. The recipe manager 122 may compare the one or more first nutritional values and the one or more second nutritional values. For example, the recipe manager 122 may compare the one or more first nutritional values and the one or more second nutritional values and determine a difference between the one or more first nutritional values and the one or more second nutritional values. In some cases, the recipe manager 122 may cause display, via a user interface, of the one or more first nutritional values, the one or more second nutritional values, and/or the difference between the nutritional values.

At block 510, the recipe manager 122 builds (e.g., generates, collects, identifies, determines, etc.) a first set of computer-executable instructions based on the second formula. The recipe manager 122 may build the first set of computer-executable instructions for one or more first automated dispensing systems. All or a portion of the one or more first automated dispensing systems may include one or more dispensers.

To build the first set of computer-executable instructions, the recipe manager 122 may identify a plurality of automated dispensing systems associated with a physical environment. Further, the recipe manager 122 may filter the plurality of automated dispensing systems to determine the one or more first automated dispensing systems from the plurality of automated dispensing systems based on the second formula. The recipe manager 122 may generate the first set of computer-executable instructions based on the second formula and the one or more first automated dispensing systems.

In some cases, the recipe manager 122 may store, in an automated dispensing system data store (e.g., data base), data associated with the plurality of automated dispensing systems (the plurality of automated dispensing systems including the one or more first automated dispensing systems). For example, the data may indicate the plurality of automated dispensing systems, a status of the plurality of automated dispensing systems (e.g., available, unavailable, online, offline, busy, installed, uninstalled, maintenance needed, etc.), a location of the plurality of automated dispensing systems (e.g., within a physical environment), etc. In some cases, dynamically generating the second formula is based on the data.

At block 512, the recipe manager 122 communicates (e.g., routes, transmits, etc.) at least a portion of the first set of computer-executable instructions to an automated dispensing system. For example, the recipe manager 122 may communicate at least a portion of the first set of computer-executable instructions to one or more first automated dispensing systems to build the first beverage as previously discussed. For all or a portion of the one or more first automated dispensing systems, the automated dispensing system may include a controller that causes one or more respective dispensers to dispense at least a respective portion of the second group of components in accordance with the second formula.

To communicate the at least a portion of the first set of computer-executable instructions, the recipe manager 122 may communicate a first portion of the first set of computer-executable instructions to a first automated dispensing system and a second portion of the second set of computer-executable instructions to a second automated dispensing system. Further, the first portion of the first set of computer-executable instructions may include instructions to dispense a first portion of the second group of components according to one or more respective measures associated with the first portion of the second group of components and the second portion of the first set of computer-executable instructions may include instructions to dispense a second portion of the second group of components according to one or more respective measures associated with the second portion of the second group of components.

Further, the recipe manager 122 may communicate the at least a portion of the first set of computer-executable instructions according to the second sequence. For example, the recipe manager 122 may communicate a first portion of the first set of computer-executable instructions to a first automated dispensing system during a first time period and a second portion of the second set of computer-executable instructions to a second automated dispensing system during a second time period.

In some cases, the recipe manager 122 may communicate a first portion of the first set of computer-executable instructions to a first automated dispensing system and a second portion of the second set of computer-executable instructions to a second automated dispensing system and may obtain an output indicating dispensation of the first portion of the second group of components. For example, the recipe manager 122 may receive the output from a monitoring system (e.g., the first automated dispensing system, the second automated dispensing system, a separate monitoring system, etc.). In some cases, the monitoring system may be implemented by the recipe manager 122. The recipe manager 122 may validate the output to confirm that the output is provided by a particular monitoring system.

The monitoring system may include one or more components and/or sensors to monitor the dispensation of the first portion of the second group of components. Further, the monitoring system may determine the dispensation of the first portion of the second group of components is complete based on monitoring the dispensation of the first portion of the second group of components. In some cases, based on determining the dispensation of the first portion of the second group of components, the monitoring system (or a separate system) may communicate instructions to a worker (e.g., an automated system) to move a receptacle associated with the first beverage from the first automated dispensing system to the second automated dispensing system.

In some cases, the monitoring system may monitor a receptacle associated with the first beverage, a worker associated with the first beverage, etc. The monitoring system may identify and track the receptacle and/or the worker using computer vision. In some cases, the monitoring system may identify and track an identifier (e.g., machine readable code) of the first beverage. The identifier of the first beverage may be associated with (e.g., affixed to, included with, etc.) the receptacle and/or the worker. For example, the identifier may be a quick response code ("QR code"), a radio-frequency tag ("RFID tag"), a barcode, etc.

Based on monitoring the receptacle and/or the worker, the monitoring system may track the receptacle as the receptacle is moved between automated dispensing systems to confirm that the receptacle has been moved. For example, the monitoring system may determine and confirm that a receptacle is moved from a first automated dispensing system to a second automated dispensing system based on monitoring the receptacle and/or the worker.

The recipe manager 122 may communicate a second portion of the first set of computer-executable instructions to the second automated dispensing system in response to communicating instructions to move a receptacle from the first automated dispensing system to the second automated dispensing system and/or confirming that the receptacle is moved from the first automated dispensing system to the second automated dispensing system.

In some cases, all or a portion of the automated dispensing systems may include and/or implement a scanning component. All or a portion of the automated dispensing systems may scan the identifier of the first beverage and, based on the identifier of the first beverage and an identifier of the particular automated dispensing system (e.g., a numerical identifier, an alphanumerical identifier, an alphabetical identifier, a symbolical identifier, etc.), request computer-executable instructions from the recipe manager 122. For example, the request may include the identifier and the identifier of the particular automated dispensing system. In response to the request for computer-executable instructions, the recipe manager 122 may filter the first set of computer-executable instructions to identify a particular portion of the first set of computer-executable instructions for execution by the particular automated dispensing system based on the identifier of the first beverage and the identifier of the particular automated dispensing system. For example, the recipe manager 122 may store the first set of computer-executable instructions and link the first set of computer-executable instructions to an identifier of the first beverage. Further, the recipe manager 122 may link different portions of the first set of computer-executable instructions to identifiers of different automated dispensing systems based on the particular automated dispensing system assigned to execute the particular portion of the first set of computer-executable instructions. The recipe manager 122 may communicate the second portion of the first set of computer-executable instructions to the particular automated dispensing system.

In some cases, the recipe manager 122 may communicate timing instructions according to the one or more second sequences with the at least a portion of the first set of computer-executable instructions to the one or more first automated dispensing systems. For example, the recipe manager 122 may communicate, to a first automated dispensing system, a first portion of the first set of computer-executable instructions and first timing instructions identifying a first time period according to the one or more second sequences for the first automated dispensing system to dispense a first portion of the second group of components according to one or more respective measures. Further, the recipe manager 122 may communicate, to a second automated dispensing system, a second portion of the first set of computer-executable instructions and second timing instructions identifying a second time period according to the one or more second sequences for the second automated dispensing system to dispense a second portion of the second group of components according to one or more respective measures. The first time period and the second time period may be the same or different time periods. The recipe manager 122 may determine the first time period and the second time period such that that the first automated dispensing system completes dispensation of a first portion of the second group of components prior to the second automated dispensing system initiating dispensation of the second portion of the second group of components. Further, the first time period and the second time period may be separated by a time period such that the partially completed beverage may be transferred between the automated dispensing systems prior to the second automated dispensing system initiating dispensation of the second portion of the second group of components. In some cases, the first set of computer-executable instructions may include the timing instructions.

In some cases, the recipe manager 122 may communicate the first set of computer-executable instructions to multiple automated dispensing systems. For example, the recipe manager 122 may communicate the first set of computer-executable instructions to a first and a second automated dispensing system and each automated dispensing system may parse the first set of computer-executable instructions to identify at least a portion of the first set of computer-executable instructions for execution by the respective automated dispensing system.

In some cases, the recipe manager 122 may obtain a request to dispense a second beverage. The recipe manager 122 may identify a third formula for the second beverage. The third formula may indicate a third group of components, one or more respective measures associated with the third group of components, and/or a third sequence of the third group of components to dispense to build the second beverage. The recipe manager 122 may obtain a second modification. The second modification may indicate a modification to a respective component of the third group of components, a modification to a respective measure associated with a respective component of the third group of components, a removal of a respective component, and/or an addition of a respective component. The recipe manager 122 may dynamically generate a fourth formula for the second beverage based on the third formula and the second modification. The fourth formula may indicate a fourth group of components, one or more respective measures associated with the fourth group of components, and/or a fourth sequence of the fourth group of components to dispense to build the second beverage. The recipe manager 122 may determine one or more second automated dispensing systems from the plurality of automated dispensing systems based on the fourth formula. The recipe manager 122 may generate a second set of computer-executable instructions based on the fourth formula and the one or more second automated dispensing systems.

In some cases, the recipe manager 122 may obtain a second modification associated with the first beverage. The second modification may indicate a modification to a respective component of the first group of components, a modification to a respective measure associated with a respective component of the first group of components, a removal of a respective component, and/or an addition of a respective component. The second modification and the first modification may be different modifications. The recipe manager 122 may dynamically generate a third formula for the first beverage based on the first formula and the second modification. The third formula may indicate a third group of components, one or more respective measures associated with the third group of components, and/or a third sequence of the third group of components to dispense to build the first beverage. The recipe manager 122 may build a second set of computer-executable instructions for one or more second automated dispensing systems based on the third formula. The recipe manager 122 may communicate at least a portion of the second set of computer-executable instructions to the one or more second automated dispensing systems to build the first beverage. For each of the one or more second automated dispensing systems, a respective controller of the respective automated dispensing system may cause a respective one or more dispensers to dispense at least a respective portion of the third group of components in accordance with the third formula.

VI. Terminology

Although certain embodiments have been described herein in connection with flavors, sauces, or syrups for coffee or tea beverages, the systems described herein can be used for any type of ingredient or food product. For example, in some embodiments, the systems herein can be used to deliver fluid or solid ingredients, such as ketchup, mustard, barbecue sauce, cheese sauce, relish, onions, etc. In some embodiments, the systems herein can be used to produce other types of beverages such as sodas, juices, smoothies, milkshakes, etc.

Conditional language used herein, such as, among others, "can," "might," "may," "for example," and the like, unless specifically stated otherwise, or otherwise understood within the context as used, is generally intended to convey that some embodiments include, while other embodiments do not include, certain features, elements, and/or states. Thus, such conditional language is not generally intended to imply that features, elements, blocks, and/or states are in any way required for one or more embodiments or that one or more embodiments necessarily include logic for deciding, with or without author input or prompting, whether these features, elements and/or states are included or are to be performed in any particular embodiment.

Depending on the embodiment, certain acts, events, or functions of any of the processes or algorithms described herein can be performed in a different sequence, can be added, merged, or left out altogether (for example, not all described operations or events are necessary for the practice of the algorithm). Moreover, in certain embodiments, operations or events can be performed concurrently.

The various illustrative logical blocks, modular dispensers, routines, and algorithm steps described in connection with the embodiments disclosed herein can be implemented as electronic hardware, computer software, or combinations of both. To clearly illustrate this interchangeability of hardware and software, various illustrative components, blocks, modular dispensers, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modular dispensers described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller, microcontroller, or state machine, combinations of the same, or the like. A processor device can include electrical circuitry that can process computer-executable instructions. In another embodiment, a processor device includes an FPGA or other programmable device that performs logic operations without processing computer-executable instructions. A processor device can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

While the above detailed description has shown, described, and pointed out novel features as applied to various embodiments, it can be understood that various omissions, substitutions, and changes in the form and details of the devices or algorithms illustrated can be made without departing from the spirit of the disclosure. For example, although different numbers have been used for similar components or features in different figures (for example, different numbers have been used for the dispenser modules, displays, controllers, etc.), the structural and functional features described in connection with one figure, embodiment, or numbered element may be incorporated into the different-numbered components or features, and vice-versa. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed:

1. A method comprising:

obtaining a request to dispense a first beverage;

identifying a first formula for the first beverage, wherein the first formula indicates a first group of components, one or more respective measures associated with the first group of components, and a first sequence of the first group of components to dispense to build the first beverage, wherein the first group of components correspond to one or more first automated dispensing systems of a set of automated dispensing systems;

obtaining a first modification, wherein the first modification indicates 1) a modification to at least one of a) a respective component of the first group of components, b) a respective measure associated with a respective component of the first group of components, c) a size of a receptacle for the first beverage, d) the first sequence, or e) an operation associated with the first beverage, 2) a removal of a respective component or operation, or 3) an addition of a respective component or operation;

dynamically generating a second formula for the first beverage based at least in part on the first formula and the first modification, wherein the second formula indicates a second group of components, one or more respective measures associated with the second group of components, and a second sequence of the second group of components to dispense to build the first beverage;

obtaining, from a data store, data indicating a set of statuses of the set of automated dispensing systems;

filtering the set of automated dispensing systems to identify one or more second automated dispensing systems to dispense the second group of components based on the set of statuses of the set of automated dispensing systems;

building a first set of computer-executable instructions for the one or more second automated dispensing systems based at least in part on the second formula, each of the one or more second automated dispensing systems comprising one or more dispensers; and communicating at least a portion of the first set of computer-executable instructions to the one or more second automated dispensing systems to build the first beverage, wherein, for each of the one or more second automated dispensing systems, a respective controller of the respective automated dispensing system causes the respective one or more dispensers to dispense at least a respective portion of the second group of components in accordance with the second formula.

2. The method of claim 1, wherein communicating the at least a portion of the first set of computer-executable instructions comprises:

communicating a first portion of the first set of computer-executable instructions to a first automated dispensing system of the one or more second automated dispensing systems to dispense a first portion of the second group of components into the receptacle located at a first location; and communicating a second portion of the first set of computer-executable instructions to a second automated dispensing system of the one or more second automated dispensing systems to dispense a second portion of the second group of components into the receptacle located at a second location.

3. The method of claim 1, wherein communicating the at least a portion of the first set of computer-executable instructions comprises:

communicating a first portion of the first set of computer-executable instructions to a first automated dispensing system of the one or more second automated dispensing systems, wherein the first portion of the first set of computer-executable instructions comprise first instructions to dispense a first portion of the second group of components according to one or more respective measures associated with the first portion of the second group of components; and communicating a second portion of the first set of computer-executable instructions to a second automated dispensing system of the one or more second automated dispensing systems, wherein the second portion of the first set of computer-executable instructions comprise second instructions to dispense a second portion of the second group of components according to one or more respective measures associated with the second portion of the second group of components.

4. The method of claim 1, wherein communicating the at least a portion of the first set of computer-executable instructions comprises:

communicating a first portion of the first set of computer-executable instructions to a first automated dispensing system of the one or more second automated dispensing systems, wherein the first portion of the first set of computer-executable instructions comprise first instructions to dispense a first portion of the second group of components according to one or more respective measures associated with the first portion of the second group of components;

obtaining, from the first automated dispensing system, an output indicating dispensation of the first portion of the second group of components; and in response to obtaining the output, communicating a second portion of the first set of computer-executable instructions to a second automated dispensing system of the one or more second automated dispensing systems, wherein the second portion of the first set of computer-executable instructions comprise second instructions to dispense a second portion of the second group of components according to one or more respective measures associated with the second portion of the second group of components.

5. The method of claim 1, wherein communicating the at least a portion of the first set of computer-executable instructions comprises:

communicating a first portion of the first set of computer-executable instructions to a first automated dispensing system of the one or more second automated dispensing systems, wherein the first portion of the first set of computer-executable instructions comprise first instructions to dispense, during a first time period according to the second sequence, a first portion of the second group of components according to one or more respective measures associated with the first portion of the second group of components; and communicating a second portion of the first set of computer-executable instructions to a second automated dispensing system of the one or more second automated dispensing systems, wherein the second portion of the first set of computer-executable instructions comprise second instructions to dispense, during a second time period according to the second sequence, a second portion of the second group of components according to one or more respective measures associated with the second portion of the second group of components.

6. The method of claim 1, wherein communicating the at least a portion of the first set of computer-executable instructions comprises:

communicating a first portion of the first set of computer-executable instructions to a first automated dispensing system of the one or more second automated dispensing systems, wherein the first portion of the first set of computer-executable instructions comprise first instructions to dispense a first portion of the second group of components according to one or more respective measures associated with the first portion of the second group of components;

obtaining, from a monitoring system, an output indicating dispensation of the first portion of the second group of components; and in response to obtaining the output, communicating a second portion of the first set of computer-executable instructions to a second automated dispensing system of the one or more second automated dispensing systems, wherein the second portion of the first set of computer-executable instructions comprise second instructions to dispense a second portion of the second group of components according to one or more respective measures associated with the second portion of the second group of components.

7. The method of claim 1, wherein the first set of computer-executable instructions are built by a computing system that is located separate from the one or more second automated dispensing systems, wherein communicating the at least a portion of the first set of computer-executable instructions comprises:

communicating the first set of computer-executable instructions to a first automated dispensing system of the one or more second automated dispensing systems and a second automated dispensing system of the one or more second automated dispensing systems.

8. The method of claim 1, wherein the one or more second automated dispensing systems comprise a plurality of controllers, and wherein the first sequence and the second sequence are different sequences for the plurality of controllers.

9. The method of claim 1, wherein the first sequence indicates a first component is to be dispensed prior to a second component and the second sequence indicates the second component is to be dispensed prior to the first component.

10. The method of claim 1, wherein communicating the at least a portion of the first set of computer-executable instructions comprises communicating the at least a portion of the first set of computer-executable instructions according to the second sequence.

11. The method of claim 1 further comprising:

storing, in an automated dispensing system database, data indicating the set of automated dispensing systems associated with a physical environment.

12. The method of claim 1 further comprising:

storing, in the data store, data indicating a location of the one or more second automated dispensing systems within a physical environment; wherein dynamically generating the second formula is further based at least in part on the location of the one or more second automated dispensing systems within the physical environment.

13. The method of claim 1, wherein the second group of components comprises a second plurality of ingredients of the first beverage.

14. The method of claim 1, wherein the one or more second automated dispensing systems comprise at least one of:

a sauce dispensing system;
a syrup dispensing system;
an espresso dispensing system;
a drip coffee dispensing system;
a cold brew coffee dispensing system;
a coffee infused with nitrogen dispensing system;
a steamed milk dispensing system;
a dairy milk dispensing system;
a non-dairy milk dispensing system;
a hot water dispensing system;
a juice dispensing system; or
a mixed beverage dispensing system.

15. The method of claim 1, wherein filtering the set of automated dispensing systems comprises:

identifying the set of automated dispensing systems associated with a physical environment; and determining the one or more second automated dispensing systems from the plurality set of automated dispensing systems based at least in part on the second formula, wherein building the first set of computer-executable instructions comprises generating the first set of computer-executable instructions in response to filtering the set of automated dispensing systems.

16. The method of claim 1, wherein filtering the set of automated dispensing systems comprises:

identifying the set of automated dispensing systems associated with a physical environment;

determining the one or more second automated dispensing systems from the set of automated dispensing systems based at least in part on the second formula,; wherein building the first set of computer-executable instructions comprises:

generating the first set of computer-executable instructions in response to filtering the set of automated dispensing systems, the method further comprising:

obtaining a request to dispense a second beverage;

identifying a third formula for the second beverage, wherein the third formula indicates a third group of components, one or more respective measures associated with the third group of components, and a third sequence of the third group of components to dispense to build the second beverage;

obtaining a second modification, wherein the second modification indicates 1) a modification to at least one of a) a respective component of the third group of components, b) a respective measure associated with a respective component of the third group of components, c) a size of a receptacle for the second beverage, d) the third sequence, or e) an operation associated with the second beverage, 2) a removal of a respective component or operation, or 3) an addition of a respective component or operation;

dynamically generating a fourth formula for the second beverage based at least in part on the third formula and the second modification, wherein the fourth formula indicates a fourth group of components, one or more respective measures associated with the fourth group of components, and a fourth sequence of the fourth group of components to dispense to build the second beverage;

determining one or more third automated dispensing systems from the set of automated dispensing systems based at least in part on the fourth formula; and generating a second set of computer-executable instructions based at least in part on the fourth formula and the one or more third automated dispensing systems.

17. The method of claim 1 further comprising:

obtaining a second modification, wherein the second modification indicates 1) a modification to at least one of a) a respective component of the first group of components, b) a respective measure associated with a respective component of the first group of components, c) a size of a receptacle for the first beverage, d) the first sequence, or e) an operation associated with the first beverage, 2) a removal of a respective component or operation, or 3) an addition of a respective component or operation, wherein the second modification and the first modification are different modifications;

dynamically generating a third formula for the first beverage based at least in part on the first formula and the second modification, wherein the third formula indicates a third group of components, one or more respective measures associated with the third group of components, and a third sequence of the third group of components to dispense to build the first beverage;

building a second set of computer-executable instructions for one or more third automated dispensing systems based at least in part on the third formula; and communicating at least a portion of the second set of computer-executable instructions to the one or more second automated dispensing systems to build the first beverage, wherein, for each of the one or more third automated dispensing systems, a respective controller of the respective automated dispensing system causes a respective one or more dispensers to dispense at least a respective portion of the third group of components in accordance with the third formula.

18. The method of claim 1 further comprising:

determining one or more nutritional values associated with the first beverage based at least in part on the first modification, a second modification, and the first formula, wherein the first modification and the second modification are generated by different data sources.

19. The method of claim 1, wherein the request and the first modification are associated with a user computing device, the method further comprising:

determining one or more nutritional values associated with the first beverage based at least in part on the second formula; and causing display, via a user interface of the user computing device, of the one or more nutritional values.

20. The method of claim 1 further comprising:

determining one or more first nutritional values associated with the first beverage based at least in part on the first formula; and determining one or more second nutritional values associated with the first beverage based at least in part on the second formula.

21. The method of claim 1 further comprising:

determining one or more first nutritional values associated with the first beverage based at least in part on the first formula;

determining one or more second nutritional values associated with the first beverage based at least in part on the second formula; and determining a difference between the one or more first nutritional values and the one or more second nutritional values.

22. The method of claim 1 further comprising:

determining one or more first nutritional values associated with the first beverage based at least in part on the first formula;

determining one or more second nutritional values associated with the first beverage based at least in part on the second formula;

determining a difference between the one or more first nutritional values and the one or more second nutritional values; and causing display, via a user interface, of the difference.

23. The method of claim 1, wherein the first formula comprises a first recipe and the second formula comprises a second recipe.

24. A computing system comprising:

memory storing first computer-executable instructions; and one or more processors coupled to the memory and configured to execute the first computer-executable instructions, wherein execution of the first computer-executable instructions causes the one or more processors to:

obtain a request to dispense a first beverage;

identify a first formula for the first beverage, wherein the first formula indicates a first group of components, one or more respective measures associated with the first group of components, and a first sequence of the first group of components to dispense to build the first beverage, wherein the first group of components correspond to one or more first automated dispensing systems of a set of automated dispensing systems;

obtain a first modification, wherein the first modification indicates 1) a modification to at least one of a) a respective component of the first group of components, b) a respective measure associated with a respective component of the first group of components, c) a size of a receptacle for the first beverage, d) the first sequence, or e) an operation associated with the first beverage, 2) a removal of a respective component or operation, or 3) an addition of a respective component or operation;

dynamically generate a second formula for the first beverage based at least in part on the first formula and the first modification, wherein the second formula indicates a second group of components, one or more respective measures associated with the second group of components, and a second sequence of the second group of components to dispense to build the first beverage;

obtain, from a data store, data indicating a set of statuses of the set of automated dispensing systems;

filter the set of automated dispensing systems to identify one or more second automated dispensing systems to dispense the second group of components based on the set of statuses of the set of automated dispensing systems;

build second computer-executable instructions for the one or more second automated dispensing systems based at least in part on the second formula, each of the one or more second automated dispensing systems comprising one or more dispensers; and communicate at least a portion of the second computer-executable instructions to the one or more second automated dispensing systems to build the first beverage, wherein, for each of the one or more second first-automated dispensing systems, a respective controller of the respective automated dispensing system causes the respective one or more dispensers to dispense at least a respective portion of the second group of components in accordance with the second formula.

25. Non-transitory computer readable media comprising first computer-executable instructions, wherein execution of the first computer-executable instructions causes one or more processors to:

obtain a request to dispense a first beverage;

identify a first formula for the first beverage, wherein the first formula indicates a first group of components, one or more respective measures associated with the first group of components, and a first sequence of the first group of components to dispense to build the first beverage, wherein the first group of components correspond to one or more first automated dispensing systems of a set of automated dispensing systems;

obtain a first modification, wherein the first modification indicates 1) a modification to at least one of a) a respective component of the first group of components, b) a respective measure associated with a respective component of the first group of components, c) a size of a receptacle for the first beverage, d) the first sequence, or e) an operation associated with the first beverage, 2) a removal of a respective component or operation, or 3) an addition of a respective component or operation;

dynamically generate a second formula for the first beverage based at least in part on the first formula and the first modification, wherein the second formula indicates a second group of components, one or more respective measures associated with the second group of components, and a second sequence of the second group of components to dispense to build the first beverage;

obtain, from a data store, data indicating a set of statuses of the set of automated dispensing systems;

filter the set of automated dispensing systems to identify one or more second automated dispensing systems to dispense the second group of components based on the set of statuses of the set of automated dispensing systems;

build second computer-executable instructions for the one or more second automated dispensing systems based at least in part on the second formula, each of the one or more second automated dispensing systems comprising one or more dispensers; and communicate at least a portion of the second computer-executable instructions to the one or more second automated dispensing systems to build the first beverage, wherein, for each of the one or more second automated dispensing systems, a respective controller of the respective automated dispensing system causes the respective one or more dispensers to dispense at least a respective portion of the second group of components in accordance with the second formula.

* * * * *